United States Patent [19]

Needham et al.

[11] Patent Number: 5,607,531
[45] Date of Patent: Mar. 4, 1997

[54] FILAMENT COATING PROCESS

[75] Inventors: Donald G. Needham, Ramona; William Kinzie, Cleveland; James H. Harris, Bartlesville, all of Okla.

[73] Assignee: Polyplus, Inc., Bartlesville, Okla.

[21] Appl. No.: 475,319

[22] Filed: Jun. 5, 1995

[51] Int. Cl.[6] ............................. B05D 1/28; D04H 3/08
[52] U.S. Cl. .................... 156/166; 156/180; 156/433; 427/428; 427/434.3; 427/434.4; 427/434.6
[58] Field of Search .................. 427/428, 434.3, 427/434.6, 434.4; 65/432, 447, 450; 156/180, 166, 433; 118/DIG. 19, DIG. 20, 202, 208, 224, 226, 227, 234, 420, 423, 424

[56] References Cited

U.S. PATENT DOCUMENTS

| | | |
|---|---|---|
| 2,429,314 | 10/1947 | Goldman . |
| 3,117,888 | 1/1964 | Fox . |
| 4,154,634 | 5/1979 | Shobert et al. . |
| 4,177,304 | 12/1979 | Berry ........................ 427/434.3 |
| 4,540,737 | 9/1985 | Wissbrun et al. . |
| 4,752,513 | 6/1988 | Rau et al. . |
| 4,755,335 | 7/1988 | Ghorashi .......................... 264/48 |
| 4,949,667 | 8/1990 | Yoshida et al. . |
| 5,114,516 | 5/1992 | Pilling et al. . |
| 5,190,809 | 3/1993 | Marissen et al. . |

FOREIGN PATENT DOCUMENTS

1037337  8/1958  Germany .

*Primary Examiner*—Shrive Beck
*Assistant Examiner*—David M. Maiorana
*Attorney, Agent, or Firm*—Timothy R. Kroboth

[57] ABSTRACT

The present invention provides a novel filament coating process. Useful filaments include high strength, reinforcing fiber such as fiberglass. By the process, a filament bundle is transversely spread and individual filaments are coated. In a particular application, pultruded rod may be advantageously made from the coated filament.

20 Claims, 5 Drawing Sheets

FILAMENT COATING PROCESS

TECHNICAL FIELD

This invention relates to spreading a bundle of filaments and coating the filaments.

BACKGROUND ART

As illustrated by U.S. Pat. Nos. 2,429,314 to Goldman, 4,177,304 to Berry and 4,949,667 to Yoshida et al, coating a web by passing it through a nip between opposing rolls and supplied with a bath or puddle of coating material, is known. The rolls may have ordinary smooth surfaces or may have surfaces with recesses. As shown in Berry, a roll may rotate freely and be movable for positioning into nip engagement.

Also known, as exemplified by U.S. Pat. No. 3,117,888 to Fox and German Auslegeshrift No. 1,037,337 of Fiberbond Laboratories, Inc., are filament coating processes. In the Fox process, coating liquid is applied as a plurality of filaments are converged into a single strand by a gathering device. In the Fiberbond process, untwisted yarn of parallel fibers adhesively bonded together is prepared by drawing of the fiber, soaking the fiber with adhesive at a dipping station formed by a nip between opposing rolls including a napped roll, and then collecting the fiber by opposing friction and pressure applied by a movable cork-covered roll against the napped roll. In a modification, a movable pressure roll presses fiber against an adhesive-bearing, dip or transfer roll, and thereafter the fiber is collected; and pressure is regulated through a lever and weights.

Despite the foregoing and other improvements, there is a need for an improved filament coating process, and in particular a filament coating process that has beneficial application in making pultruded rod.

SUMMARY OF THE INVENTION

In accordance with the present invention, there is provided a novel filament coating process by which a filament bundle is transversely spread and individual filaments are coated. By the process, a mass of molten coating material is applied to a nip formed by a first coating roll and a second coating roll, and a filament bundle is passed into the nip. As the filament bundle and molten coating material pass through the nip, transverse spreading of the filament bundle is effected by force exerted by the molten coating material, which also produces coating contact of the coating material with the filaments.

Beneficially, the second coating roll includes a relief area of a suitable depth and an appropriate width, and the bundle of filaments is passed through the nip in an area defined by the relief area. Furthermore, the second coating roll is advantageously an idler roll adjustably mounted for the nip engagement with the first coating roll, and the molten coating material is acted upon by a force applied to the idler roll.

preferably, the coated filaments pass from the first nip through a second nip formed by the second coating roll and a third coating roll, and additional molten coating material is applied to the coated filaments as they pass through the second nip. Advantageously, this additional coating material is fed by a mass of molten coating material originating from the mass of coating material applied to the first nip. In this case, the idler roll is preferably eccentrically mounted between the first and third coating rolls, and able to bear upon the first and third coating rolls.

In a variation, a filament coating process in accordance with the present invention, includes passing a plurality of bundles of filaments into the first nip and transversely spreading the bundles of filaments and applying the molten coating material to the filaments. To this end, the second coating roll beneficially may include a relief area of a greater width than that needed in the earlier described process. In this variation, it may be advantageous to apply a transverse strength-enhancing fabric to the transversely spread and coated filaments.

Also in accordance with the invention, a plurality of filament strands coated as earlier described, may be passed through preheating means for preheating the coated strands to a temperature preferably near but not less than the melt temperature of the coating material. Thereafter, the preheated strands are passed into a pultrusion die which is advantageously at a temperature near but not more than the melt temperature; and pultruded rod formed from the plurality of coated filament strands, is pulled from the pultrusion die.

In the drawing and in the detailed description of the invention that follows, there are shown and essentially described only preferred embodiments of this invention, simply by way of illustration of the best mode contemplated of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawings, which form a part of the specification of the present invention, and which depict preferred embodiments in accordance with the present invention.

DETAILED DESCRIPTION

Figure 1:
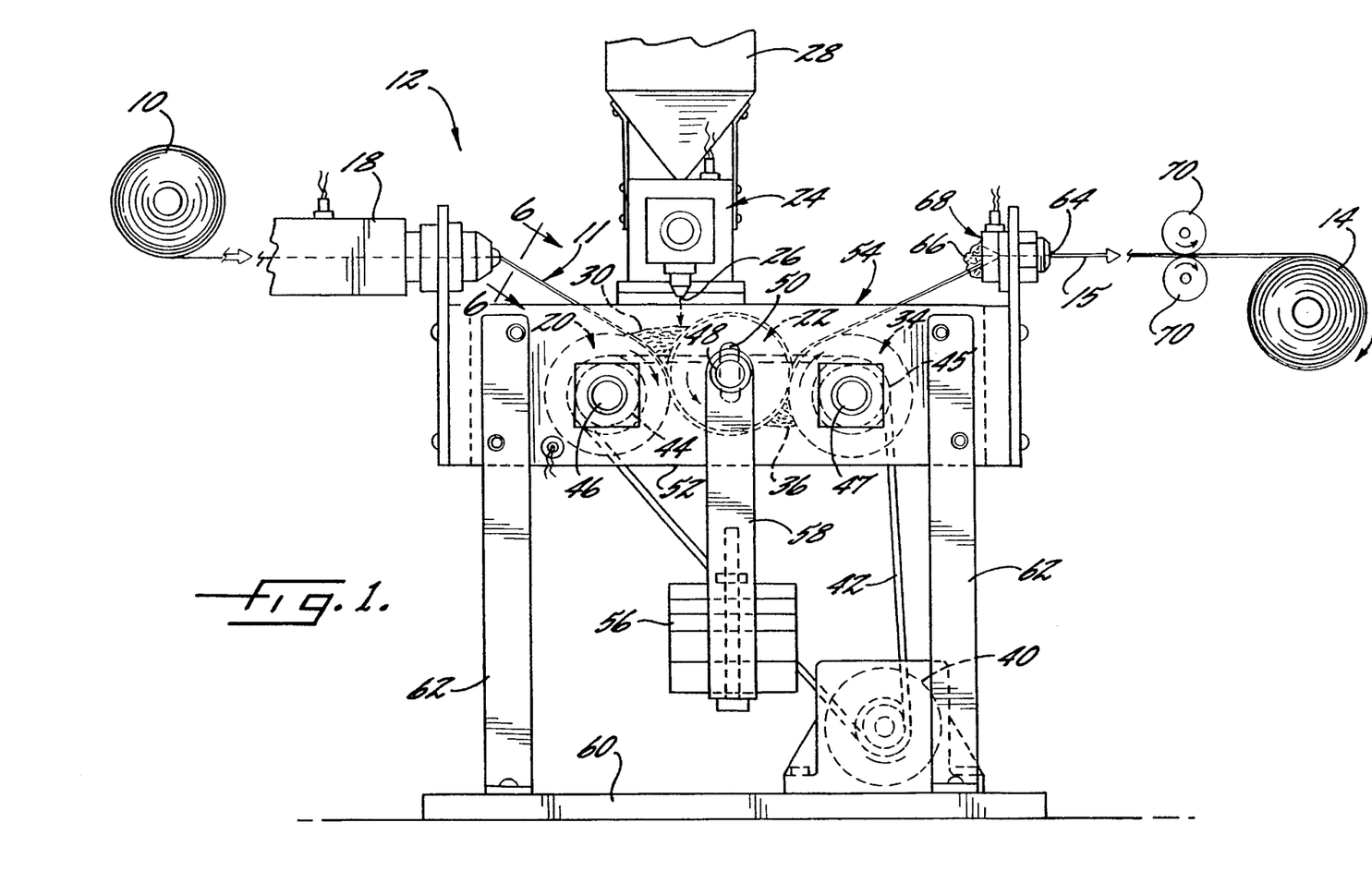
FIG. 1 illustrates a preferred filament coating process in accordance with the present invention.
Figure 2:
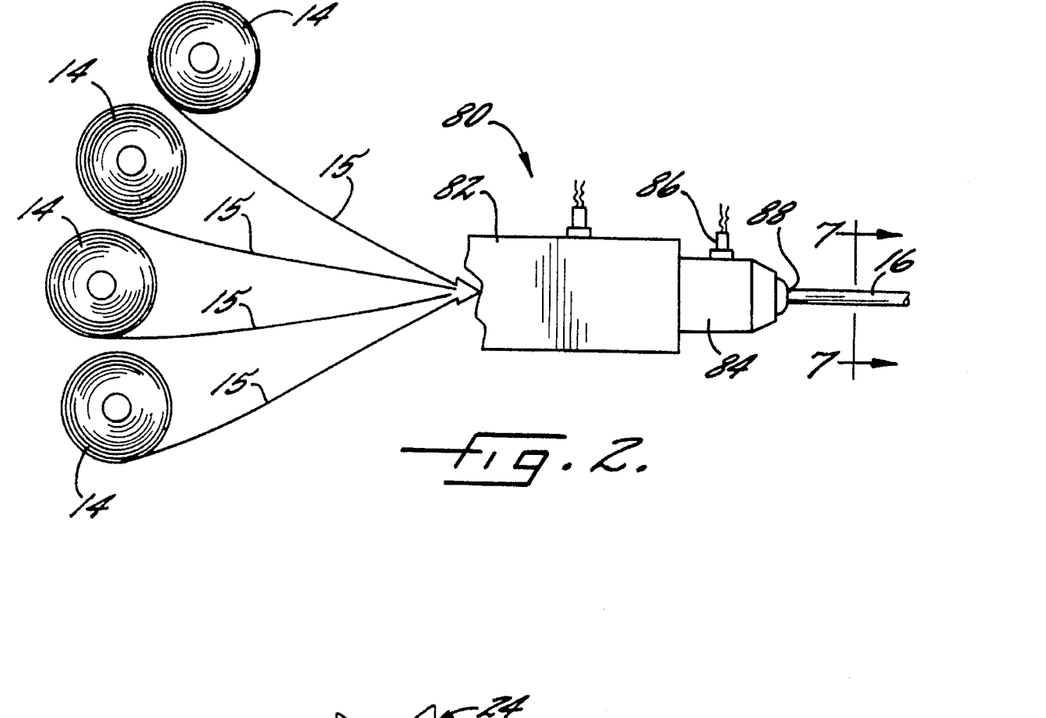
FIG. 2 schematically depicts a preferred pultrusion process for beneficially using filament coated in accordance with the present invention.

As mentioned, the present invention relates to a filament coating process. More particularly, the present invention is primarily based upon the use of coating rolls which in combination with one or more masses of molten coating material, spread a filament bundle and coat individual filaments with the coating material. In a particular application, fiberglass rod is thereafter pultruded from a plurality of fiberglass bundles well impregnated with matrix polymer. Thus, in accordance with the invention as illustrated in FIG. 1, a roll 10 of filament to be coated, is processed using a preferred coating apparatus 12, to provide a roll 14 of coated filament; and as illustrated in FIG. 2, rolls 14 of coated filament may thereafter be processed using a preferred pultrusion apparatus 80 and pulling pultruded rod 16 from the pultrusion apparatus. In another application, transverse strength may be provided to coated filament by laminating a fabric thereto.

Filament to be coated by the present invention is typically continuous reinforcing fiber, in particular high strength, structural fiber. Exemplary high strength, structural fiber includes glass fiber such as E glass and S glass, carbon fiber, aramid fiber, polyphenylene sulfide fiber, and liquid crystalline polymer fiber. Mixtures of fiber may be used. Thus, carbon fiber could be in pultruded rod made from another reinforcing fiber, for the purpose of being an electrically resistive element for tack welding the pultruded rod to a plastic member needing strengthening. See Canadian patent No. 1,325,092 directed to welding rods, relative thereto.

Figure 3:
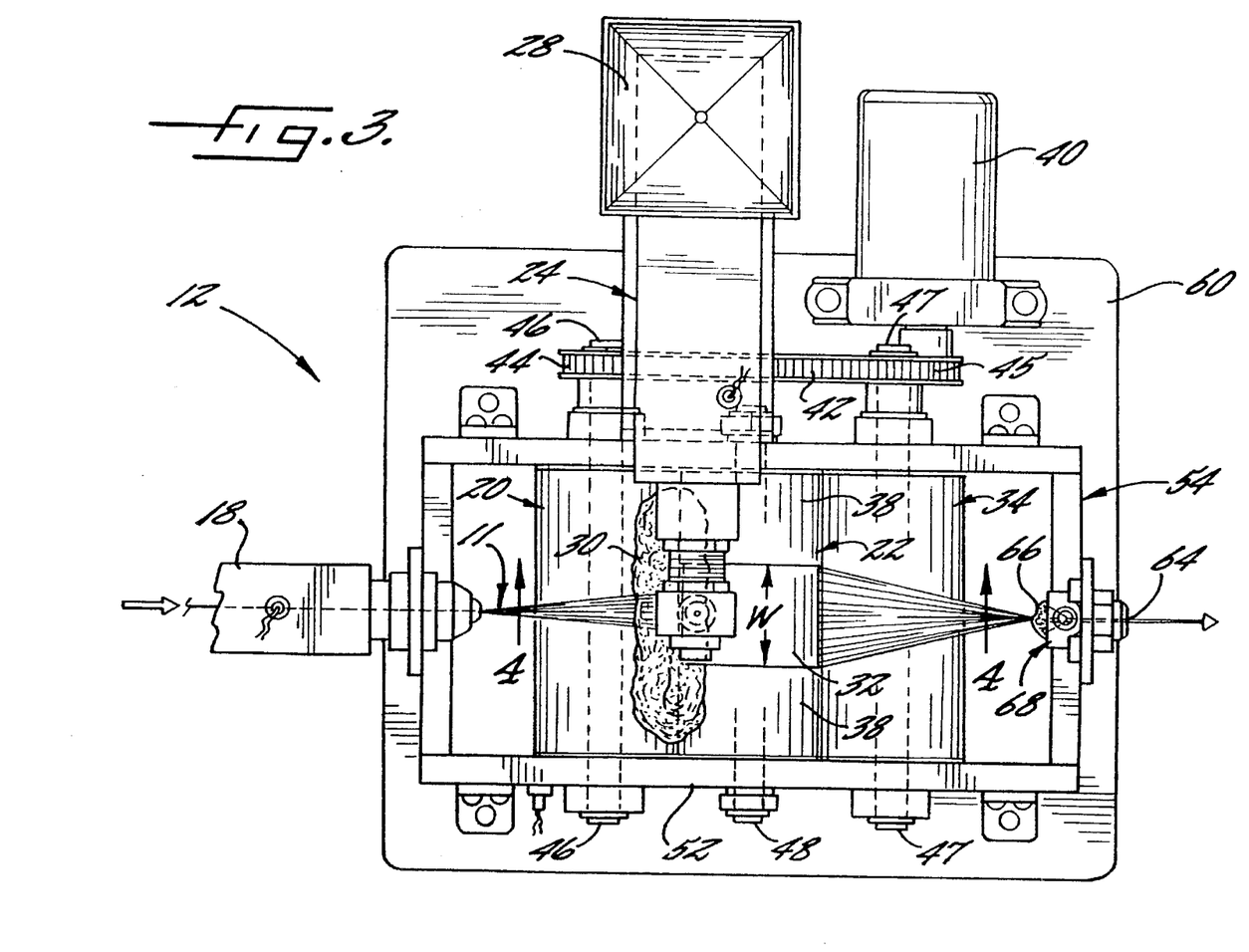
FIG. 3 is a top view of the filament coating process of FIG. 1.

Referring particularly to FIGS. 1 and 3, preferred coating apparatus 12 beneficially includes preheating means 18 suitably in the form of an electric heater, for preheating a filament bundle 11 prior to coating. Suitably, to this end, the filament bundle is passed through the electric heater, which is axially hollow. Other preheating means may of course be used.

The temperature to which the filament bundle is preheated, will vary depending upon factors including the filamentary material to be coated, and the melt temperature of the filament coating material. However, it will generally be advantageous to preheat the filamentary material to a temperature near the melt temperature of the coating material. Thus, for example, in the case of polyethylene or polypropylene coating resin, a useful preheat temperature will typically be in the range of about 50° to 550° F., whereas for polyethylene terephthalate, a useful preheat temperature will usually be from about 600° to 650° F.

Figure 4:
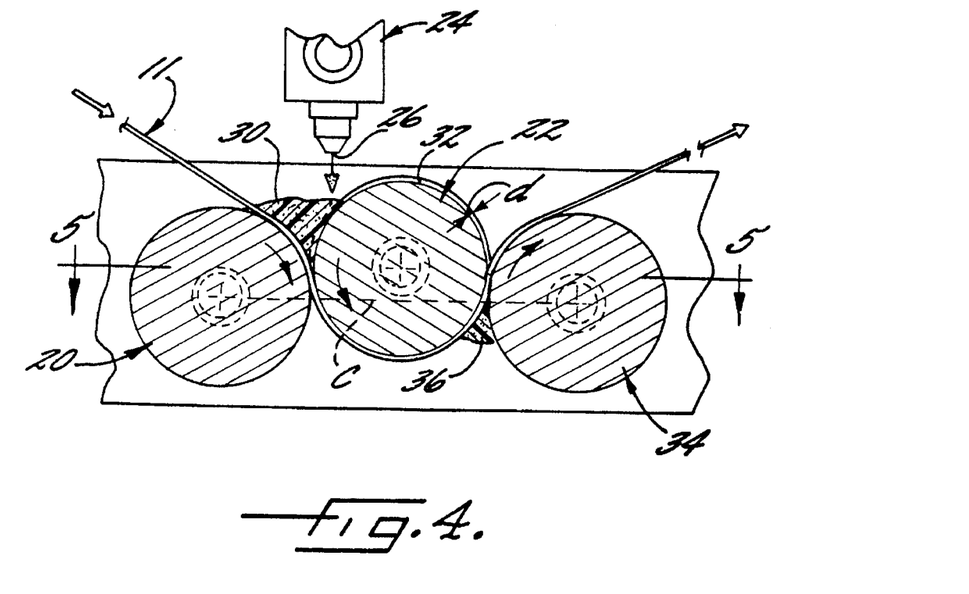
FIG. 4 is an enlarged cross-sectional view taken substantially along line 4—4 of FIG. 3.
Figure 6:
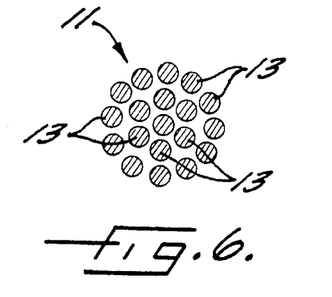
FIG. 6 is an enlarged cross-sectional view taken substantially along line 6—6 of FIG. 1.
Figure 7:
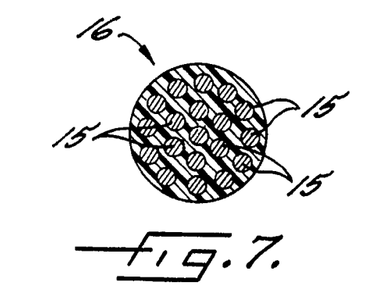
FIG. 7 is an enlarged cross-sectional view taken substantially along line 7—7 of FIG. 2.

With reference also to FIGS. 4 and 6, coating rolls 20,22 form a nip into which preheated bundle 11 of filaments 13 is passed, for spreading of the bundle transverse to the direction of movement of said bundle through the nip, and for filament coating. The direction of movement of bundle 11 through the nip is indicated in FIG. 4. An extruder 24 with a heated barrel and having a discharge opening 26, provides the coating material in molten form to the nip. As indicated in the drawing, discharge opening 26 is conveniently located for this purpose to the left of center of roll 22.

A variety of filament coating materials may be used, with the particular coating material selected depending upon considerations including the filament to be coated. Typically, a useful coating material strengthens the filament bundle and will often be termed "matrix polymer" when used in making pultruded rod. Exemplary coating materials include polyethylene, polypropylene, polyethylene terephthalate, polyphenylene sulfide and liquid crystalline polymer, in particular melt-processable liquid crystalline polymer. As later discussed, a benefit of the inventive filament coating process is that it makes possible the addition of a stiffening additive to the matrix polymer, particularly when making pultruded rod.

As is conventional, the filament coating material is conveniently added in solid form to a hopper 28, which feeds the extruder, and the coating material is discharged from the extruder in molten form. The coating material is advantageously discharged in a quantity sufficient to form a mass or bank 30 which pools above the nip and feeds the nip. Preferably, the discharge temperature is not so great that the coating material has too much flow, but rather collects as a molten mass above the nip. As will become understood, a sufficient amount of the coating material above the nip and feeding the nip is important to achieve the transverse spreading of the bundle.

Figure 5:
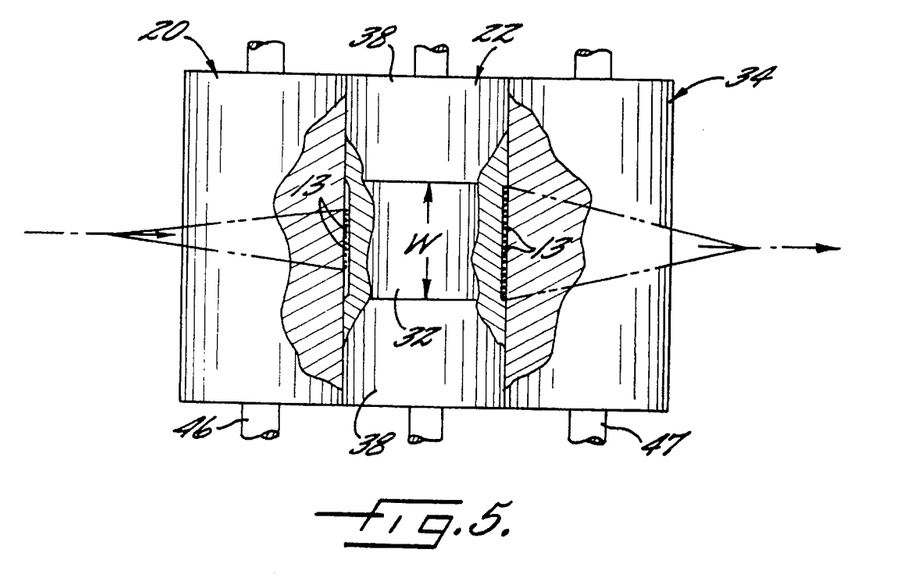
FIG. 5 is an partial cross-sectional view taken substantially along line 5—5 of FIG. 4.

Beneficially, coating roll 22 is provided with a relief area 32 of a suitable depth "d" shown in FIG. 4, and of an appropriate width "w" best seen in FIGS. 3 and 5, and the filament bundle is fed, as illustrated in FIGS. 3 and 5, into the portion of the nip defined by relief area 32. The relief area prevents breaking of filaments. Otherwise, coating roll 22 advantageously has an ordinary smooth surface.

With particular reference to FIG. 5, a suitable depth of relief area 32 is typically substantially greater than individual diameters of filaments 13. In this way, filament coating is promoted as filaments 13 pass through the portion of the nip defined by the relief area. Advantageously, an appropriate width of the relief area is sufficient to allow all filaments of a filament bundle to be spread side by side, in other words, to permit a filament depth of one filament across the width of roll 22 as the filament exits the nip. To this end, the width of the relief area is suitably greater than the width of a filament bundle when all filaments are spread side by side.

Advantageously, coating rolls 22,34 form a second nip into which transversely spread and coated filaments exiting from the first nip, are passed, and filaments 13 remain, as illustrated in FIGS. 3 and 5, within relief area 32 of roll 22 and pass through the portion of the second nip defined by the relief area. In accordance with a preferred aspect of the invention illustrated in FIGS. 1 and 4, an excess of molten coating material beneficially passes through the nip formed by coating rolls 20,22, and forms a second mass or bank 36 of coating material which collects below and feeds the nip between coating rolls 22,34. Preferably, the temperature of the coating material is not so great that the coating material has too much flow for forming a bank below the nip, but rather collects as a molten mass below the nip.

Depth "d" of relief area 32 of coating roll 22 is useful not only for controlling thickness of filament coating but also the excess of coating material which passes through the nips. Thus, a relatively greater depth of relief area will provide relatively thicker filament coating and for passage of relatively more excess coating material through the nips, whereas a relatively shallower depth will provide relatively thinner filament coating and for passage of relatively less excess coating material through the nips.

Whereas bank 30 of the filament coating material beneficially coats topsides and sides of the filaments, bank 36 of the coating material advantageously coats undersides and applies additional coating material to sides of filaments. As may thus be understood, the combination of banks 30,36 beneficially provides for thorough coating of filaments 13 as the filaments pass through the nips between coating rolls. Moreover, whereas, as earlier indicated, bank 30 is important for transverse spreading of the filament bundle, bank 36 maintains the transverse spreading so that filaments 13 exit transversely spread from the nip between coating rolls 22,34.

Advantageously, coating rolls 20,22,34 are ordinary smooth surface rolls conveniently made of metal. Thus, these rolls would not have a plurality of surface recesses like Goldman or Yoshida et al. Beneficially, the rolls are heated to and maintained at a temperature near the melt temperature of the coating material to prevent freezing of the coating material on roll surfaces. As indicated in FIG. 1, electric heating may be used for this purpose. However, the rolls may be oil-heated.

Referring again to FIGS. 3 and 5, unrelieved or raised surface areas 38 of coating roll 22 provide for touching contact of roll 22 with the surface of coating roll 20 and the surface of coating roll 34. With reference again also to FIG. 1, rolls 20,34 are beneficially driven, whereas roll 22 is an idler roll driven by rolls 20,34. Suitable means for driving rolls 20,34 are a motor 40 and a belt 42, which engages sprocket wheels 44,45 on shafts 46,47 of rolls 20,34.

Advantageously, in accordance with a preferred aspect of the present invention illustrated in FIG. 1, idler roll 22 is adjustably mounted via a shaft 48 and a generally vertically elongated aperture 50 in a side member 52 of a coating roll support structure 54, for movement for nip engagement with driven roll 20. As best depicted in FIG. 4, idler roll 22 is eccentrically mounted between driven rolls 20,34 and is able to bear upon these rolls. In this regard, the center of shaft 48 is disposed above a dashed line "c" connecting the centers of shafts 46,47 of driven rolls 20,34.

An upward force on the idler roll is exerted by molten coating material as the coating material passes through a nip between coating rolls. Unless this force were suitably opposed, the idler roll would be forced out of nip engagement with driven roll 20, and molten coating material would quickly pass downstream of the location of this nip. As may be understood, driven roll 34 and bank 36 of molten material counteract to an extent, force exerted by bank 30 of molten material upon the idler roll.

In accordance with the present invention, the upward pressure is opposed by an appropriate opposing force applied to the idler roll so that, among other things, touching contact is maintained between unrelieved surface areas 38 of the idler roll and an exterior surface of a driven roll. As depicted in FIG. 4, bank 30 will typically have a greater mass than bank 36; as a result, when the opposing force is applied, bank 30 will generally push the idler roll out of touching contact with driven roll 20 and into touching contact with driven roll 34.

providing the opposing force, which is greater than the force pushing the idler roll upward and out of nip engagement, is a weight 56. This weight is connected to shaft 48 of the idler roll by a connecting arm 58, and is elevated above a platform 60 by legs 62 (only two shown), which support coating roll support structure 54. As depicted, weight 56 may conveniently be a combination of a series of weights, which may be added to or subtracted from as appropriate. Other conventional means for providing the opposing force may, of course, be used.

In accordance with the present invention, the force opposing the upward force exerted by coating material as it passes through a nip, is used to affect the extent of transverse spreading of the filament bundle as the bundle passes through the nip between rolls 20,22. In the event not enough downward force is provided by weight 56, transverse filament spreading will be incomplete. In accordance with the invention, it is beneficial for the downward force to be sufficient to provide complete transverse filament spreading, in other words, to provide a filament depth of one filament across the width of relief area 32 of the idler roll as the filament exits the nip between rolls 20,22. As earlier indicated, this opposing force acts upon bank 30 of molten coating material to achieve this result. Without sufficient coating material to fill the relief area of the nip and to be acted upon by this opposing force, incomplete transverse spreading will occur and dry filaments can be found downstream of this nip; and in fact, without any coating material in the nip, there will generally be no transverse spreading at all. On the other hand, bank 30 ensures a sufficiency of molten coating material for this opposing force to act upon in the relief area of the nip, to provide complete transverse filament-spreading. As may be understood, the coating material will beneficially have sufficient melt viscosity to spread the filament bundle.

In addition to affecting the extent of transverse spreading, these opposing forces affect the extent of coating material carryover through the nips and the thickness of the applied coating. Thus, if not enough downward force is provided by weight 56, too much coating material will be carried over through the nips, with waste. On the other hand, if there is too much downward force, then too thin a coating may be applied to filaments. However, generally speaking, thickness of filament coating is best controlled by selecting a roll 22 having an appropriate depth of the relief area.

As may thus be understood, idler roll 22 is adjustably mounted for moving into nip engagement to provide the desired force to be exerted upon the fiber bundle by means of the coating material. In accordance with the invention, this force is beneficially sufficient to ensure complete transverse spreading of filament. As explained, the coating material in this invention provides not only a coating function but also a filament spreading function. Moreover, the two banks of coating material and the pressure exerted during the filament coating advantageously ensure a thorough coating of individual filaments such that the top, sides and bottom of individual filaments are coated. In addition, the two banks of coating material are so disposed as to exert to an extent, opposing forces against one another. Similarly, coating roll 34 is so disposed as to exert to an extent, an opposing force against force exerted by bank 30.

Thereafter, referring again to FIGS. 1 and 3, the transversely spread and thoroughly coated filaments are passed from the nip between rolls 22,34 through an aperture 64 of suitable size to remove excess coating material 66 and compress the coated filaments into a narrower, thicker strand 15. The aperture is suitably provided in a heated die 68 of the coating apparatus.

Puller wheels 70 pull the filament through the coating apparatus. As is conventional, these wheels rotate at a slightly faster speed than the speed at which a coating roll is driven. Thereafter, the coated filament is suitably wound into roll 14.

Unlike prior art coating apparatus such as that of the Fiberbond process, the present invention does not use napped or cork-covered rolls because such rolls would interfere with force-induced, transverse filament spreading. For this reason, coating rolls having hard, rather than compressible, surfaces are beneficially used in the present invention, and thus the coating rolls will conveniently have metal surfaces.

Operation of coating apparatus 12 is now described. In coating apparatus 12, as earlier pointed out, the center portion (that is, relief area 32) of roll 22 is of smaller diameter than ends 38 of roll 22, coating rolls 20,34 are driven whereas coating roll 22 is an idler roll driven by contact of ends 38 with rolls 20,34, and idler roll 22 is adjustably mounted for applying force to molten coating material in the nip formed by rolls 20,22. The depth of the relief may be, for instance, in the range of 8 to 10 thousands of an inch for coating fiberglass. Coating rolls 20,22,34 are heated to a temperature appropriate for maintaining the molten state of the coating material.

By the process, coating material is extruded to form a bank or mound of molten coating material in and above the nip between coating rolls 20,22 and feeding the nip, and fiber roving preheated to a temperature near the melt temperature of the coating material, is passed over roll 20 and into the portion of the nip defined by relief area 32. Beneficially, a sufficient force is applied to idler roll 22 to cause the idler roll to act upon the molten coating material so that the roving is transversely spread such that the filaments are side by side, and so that the coating material is in coating contact with upper surfaces and sides of the filaments.

Transversely spread and coated filaments exit from the nip and pass under the idler roll. The depth of the relief area and the downward force exerted by weight 56 advantageously permit carryover of coating material through the nip between rolls 20,22 so that second bank 36 of molten coating material builds up at an underside location where filament enters the nip between rolls 22,34, as well as affect the thickness of the coating. For coating fiberglass, the thickness of the coating will typically be such that the weight ratio of fiberglass to coating material ranges from about 20 to 60 wt. % fiberglass to about 80 to 40 wt. % coating material.

The filaments remain within relief area 32 and pass through the portion of the second nip defined by the relief area. Coating material from second bank 36 is forced through the nip between rolls 22,34, with the result that filament spreading is maintained, bottom surfaces of filaments are coated, and additional resin is applied to sides of filaments.

Coated filaments thereafter pass over the top of roll 34 and through aperture 64, which for example may be ⅜" wide and 0.025" high when coating a double strand. The filaments are pulled through the aperture by puller wheels 70. Wheels 70 rotate at a slightly faster rate than rolls 20,34 are driven.

Referring now in detail to FIG. 2, a specific application in which pultruded rod is the end-product, is schematically shown. As depicted, fiber 15 from a plurality of rolls 14 and coated with a matrix polymer in accordance with the filament coating process of the present invention, is beneficially fed into a preheater 82 and thereafter through a heated pultrusion die 84 of pultrusion apparatus 16.

Beneficially, because the fiber is thoroughly coated, it is not necessary as in conventionally making pultruded rod as exemplified by U.S. Pat. No. 4,540,737 to Wissbrun et al, to add matrix polymer to the fiber during its residence time in the pultrusion die, and as a consequence, to maintain the pultrusion die above the melt temperature of the matrix polymer. To the contrary, the present invention makes possible a lower die temperature, as now explained.

The entrance to the pultrusion die and the downstream portion of the pultrusion die are beneficially separately heated. At start-up, the die entrance and the downstream die portion are conveniently heated to about the same temperature, which is at or above the melt temperature of the matrix polymer. However, once the pultrusion process is up to line speed, heater 86 for the downstream die portion is turned off, and the downstream die portion, in particular the exit portion as generally defined by an exit opening 88, is allowed to cool to a temperature below the melt temperature of the matrix polymer. As may be understood, this particular temperature will depend upon the matrix polymer applied to the fiber by the coating process; however, typically, this temperature will be near, that is, generally within about 25° F., but not greater than the melt temperature of the matrix polymer. If the temperature of the downstream portion of die 84 is too low, the matrix polymer will stick to the die.

Instead of adding matrix polymer to the fiber in the pultrusion die, fiber thoroughly coated in accordance with the filament coating process of the present invention, is advantageously preheated using preheater 82, to a temperature near but not less than the melt temperature of the matrix polymer. By "near" is meant that the temperature is generally within about 25° to 60° F. of the melt temperature. As may be understood, an appropriate temperature will depend upon factors including the thickness of the matrix polymer coating and the melt viscosity of the matrix polymer.

Suitably, preheater 82 is in the form of an electric heater and coated fiberglass enters the heater through entry openings (not shown) and passes through the electric heater, which is axially hollow. Advantageously, at least pairs and preferably more strands of coated fiberglass, enter an entry opening; in this way, a preheater may have fewer entry openings.

Pultruded rod exits die 84 at exit opening 88. For a pultruded rod of ½" diameter, the exit opening will for precise sizing preferably be slightly less than ½" to compensate for swell.

As mentioned, a stiffening additive such as a mineral filler, may be added in an effective quantity to the matrix polymer prior to carrying out the filament coating process. Exemplary mineral fillers include talc and calcium carbonate. Talc may be beneficially used when polyethylene is the matrix polymer, and calcium carbonate may be advantageously used when polypropylene is the matrix polymer. Suitable loadings of mineral filler may range from about 20 to 30 wt. % for a high degree of stiffening. Thus, for example, fiberglass pultruded rod having a polymer matrix consisting of about 30 wt. % talc 70 wt. % polyethylene, can be beneficially provided at a lower cost than comparably stiff, fiberglass pultruded rod having polyethylene terephthalate as the polymer matrix. In addition, mineral filler generally benefits pultruded rod product having close tolerances because swell is reduced.

As is conventional in making pultruded rod, it is desirable that the bundles of the reinforcing fibers should be well impregnated with the matrix polymer, and that the fibers should be well bonded to the matrix polymer. As may be understood, the filament coating process of the present invention is advantageous in achieving these results. In addition, the foregoing pultrusion process is beneficially more rapid than the conventional process exemplified by Wissbrun et al. Moreover, a relatively lower temperature of the pultrusion die advantageously permits the skin of pultruded rod to set up so as to reduce swell and prevent deforming after exiting the die.

It is not necessary to wind coated filament 15 into roll form and thereafter unwind the filament for forming rod, as shown in FIGS. 1 and 2. Rather, multiple strands of coated filament may be fed directly to the pultrusion apparatus.

Figure 8:
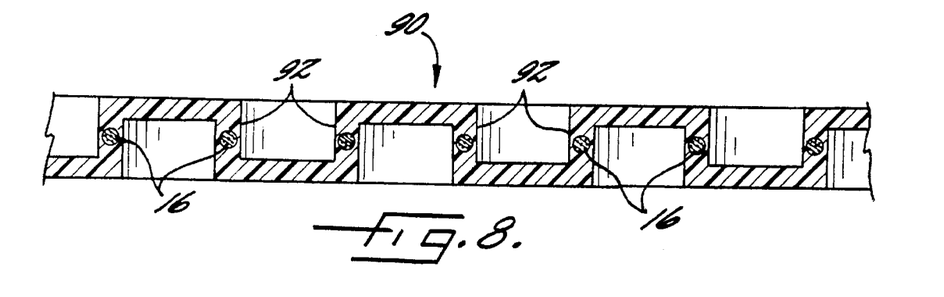
FIG. 8 is a cross-sectional view of a support structure including rods pultruded in accordance with the present invention.

In FIG. 8, a load-bearing structure 90 similar to that of U.S. Pat. No. 5,405,567 is shown. A distinguishing feature of the structure of FIG. 8, however, is the strengthening presence of pultruded fiberglass rods 16 in structure walls 92.

Figure 9:
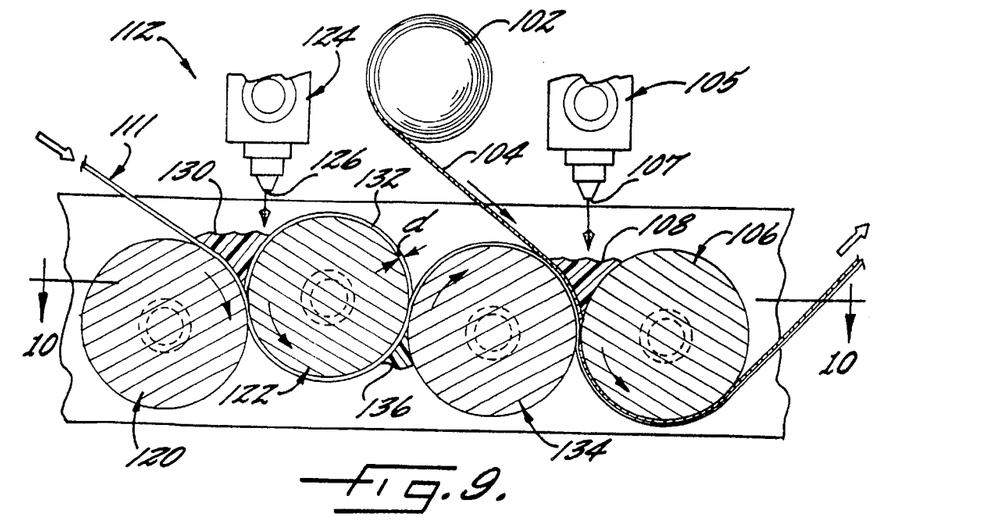
FIG. 9 is a second preferred embodiment of a filament coating process in accordance with the present invention.
Figure 10:
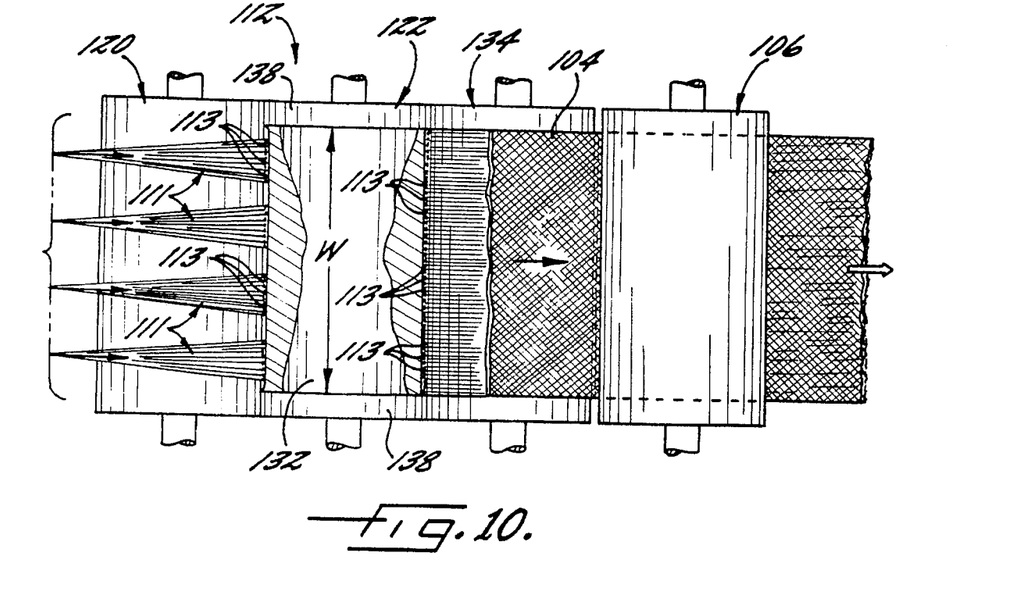
FIG. 10 is a partial cross-sectional view taken substantially along line 10—10 of FIG. 9.

Referring to FIGS. 9 and 10, a preferred coating apparatus 112 in accordance with the present invention, may be used to simultaneously spread a plurality of filament bundles transversely, and to coat the filaments; and thereafter, if desired, to provide transverse strength to the coated filaments by laminating thereto a fabric. Preferred filament/fabric structures include fiberglass/woven fiberglass fabric, carbon fiber/woven carbon fiber fabric, aramid fiber/woven aramid fiber fabric, and polyphenylene sulfide fiber/woven polyphenylene sulfide fiber fabric. For sake of brevity, like features are not described in FIGS. 9 and 10, but rather are indicated by reference numerals corresponding to those of coating apparatus 12.

Coating apparatus 112 includes a feed roll 102 of a fabric 104, a source 105 of molten material, and a fourth coating roll 106. Source 105 of molten material has a discharge opening 107, which provides the molten material to the nip formed by rolls 134,106. The molten material is advantageously discharged in a quantity sufficient to form a bank 108 of resin, which forms above and feeds the nip formed by rolls 134,106. As indicated in FIG. 10, fabric 104 is sufficiently porous to allow the molten material, which forms a bank on the topside of the fabric, to pass through the pores for consolidation of cross strength-enhancing fabric 104 and the underlying coated filaments. In a variation in which coated filaments are not laminated to fabric, coating roll 122 could have a plurality of relief areas spaced apart from one another by unrelieved or raised areas, rather than a single relief area.

In operation, a mass 130 of molten coating material is applied to a nip formed by a first coating roll 120 and coating roll 122, a plurality of preheated bundles 111 of filaments 113 are passed into the nip, and as the filaments pass through the nip, the bundles of filaments are transversely spread and the molten coating material is applied to the filaments as previously described. Coating roll 122 includes a relief area 132 of a selected depth "d" and of a selected width "w" and the bundles of filaments pass through the nip in an area defined by the relief area. Relief area 132 is relatively wider than that of roll 22. Coating roll 122 is, as previously described, an idler roll adjustably mounted for the nip engagement with coating roll 120.

Thereafter, the coated filaments are passed through a second nip formed by coating roll 122 and third coating roll 134, and molten coating material is applied to the filaments as they pass through the second nip. A mass 136 of molten coating material feeds the second nip, and this mass originates from mass 130 of coating material, as previously described. Mass 136 of molten coating material collects below and feeds the second nip.

Then, the coated filament passes over coating roll 134 and is laminated to fabric 104 at a nip formed by coating roll 134 and fourth coating roll 106. Mass 108 of molten material discharged by source 105, forms above and feeds this nip.

In the preceding description of the present invention, there are shown and essentially described only preferred embodiments of this invention, but as mentioned, it is to be understood that the invention is capable of changes or modifications within the scope of the inventive concept expressed herein. Several changes or modifications have been briefly mentioned for purposes of illustration.

We claim:

1. A filament coating process comprising applying a mass of molten coating material to a nip formed by a first coating roll and a second coating roll comprising a relief area of a selected depth, passing a bundle of filaments into said nip, and as said filaments pass through said nip in an area defined by said relief area, transversely spreading said bundle of filaments by force exerted upon said filaments and applying said coating material to said filaments.

2. The filament coating process of claim 1, comprising preheating said bundle of filaments prior to the step of passing said bundle of filaments into said nip.

3. The filament coating process of claim 1, wherein said second coating roll is an idler roll adjustably mounted for the nip engagement with said first coating roll, and said force exerted upon said filaments is applied by said idler roll acting upon said molten coating material.

4. The filament coating process of claim 1, wherein said filaments are reinforcing filaments selected from the group consisting of fiberglass, carbon fiber, aramid fiber, polyphenylene sulfide fiber, liquid crystalline polymer fiber, and mixtures thereof.

5. The filament coating process of claim 1, wherein said coating material is selected from the group consisting of polyethylene, polypropylene, polyethylene terephthalate, polyphenylene sulfide and liquid crystalline polymer.

6. A filament coating process comprising applying a mass of molten coating material to a nip formed by a first coating roll and a second coating roll, passing a bundle of filaments into said nip, and as said filaments pass through said nip, transversely spreading said bundle of filaments and applying said coating material to said filaments, and thereafter passing said coated filaments and an excess of said coating material from said nip, and by a second mass of said coating material thereby originating from said mass of coating material, said second mass having collected below and feeding a second coating nip formed by said second coating roll and a third coating roll, further coating said coated filaments as said filaments pass through said second coating nip.

7. The filament coating process of claim 6, wherein said second coating roll is an idler roll adjustably mounted for the nip engagement with said first coating roll, and a force applied to said idler roll affects the extent of carryover of said coating material to said second coating nip.

8. The filament coating process of claim 6, wherein said second coating roll comprises a relief area of a selected depth, and wherein said bundle of filaments is passed through said nip in an area defined by said relief area.

9. The filament coating process of claim 6, wherein said filaments are reinforcing filaments selected from the group consisting of fiberglass, carbon fiber, aramid fiber, polyphenylene sulfide fiber, liquid crystalline polymer fiber, and mixtures thereof; and wherein said coating material is selected from the group consisting of polyethylene, polypropylene, polyethylene terephthalate, polyphenylene sulfide and liquid crystalline polymer.

10. A filament coating process comprising applying a mass of molten coating material to a nip formed by a first coating roll and an idler roll adjustably mounted for the nip engagement with said first coating roll, passing a bundle of filaments into said nip, and as said filaments pass through said nip, transversely spreading said bundle of filaments and applying said coating material to said filaments, and thereafter passing said coated filaments from said nip through a second coating nip formed by said idler roll and a third roll, said idler roll being eccentrically mounted between said first coating roll and said third roll and being able to bear upon said first coating roll and said third roll.

11. The filament coating process of claim 10, wherein said second coating roll comprises a relief area of a selected depth, and wherein said bundle of filaments is passed through said nip in an area defined by said relief area.

12. The filament coating process of claim 10, wherein said filaments are reinforcing filaments selected from the group consisting of fiberglass, carbon fiber, aramid fiber, polyphenylene sulfide fiber, liquid crystalline polymer fiber, and mixtures thereof; and said coating material is selected from the group consisting of polyethylene, polypropylene, polyethylene terephthalate, polyphenylene sulfide and liquid crystalline polymer.

13. A filament coating process comprising applying a mass of molten coating material to a nip formed by a first coating roll and a second coating roll, passing a plurality of bundles of filaments into said nip, and as said filaments pass through said nip, transversely spreading said bundles of filaments by force exerted upon said filaments and applying said coating material to said filaments, and thereafter applying a fabric to the transversely spread and coated filaments.

14. The filament coating process of claim 13, wherein a filament/fabric structure thereby made, is selected from the group consisting of fiberglass/woven fiberglass fabric, carbon fiber/woven carbon fiber fabric, aramid fiber/woven aramid fiber fabric, and polyphenylene sulfide fiber/woven polyphenylene sulfide fiber fabric.

15. A process for making formed composite, said process comprising applying a mass of molten coating material to a nip formed by a first coating roll and a second coating roll, passing a bundle of filaments into said nip, and as said filaments pass through said nip, transversely spreading said bundle of filaments and applying said coating material to said filaments; thereafter preheating a plurality of filament strands thereby coated; thereafter passing said plurality of preheated strands into a pultrusion die which is at a defined temperature near but not more than the melt temperature of said coating material, downstream of an entrance to said die; and thereafter pulling formed composite comprising said plurality of filament strands, from said pultrusion die.

16. The process of claim 15, wherein said filaments are reinforcing filaments selected from the group consisting of fiberglass, carbon fiber, aramid fiber, polyphenylene sulfide fiber, liquid crystalline polymer fiber, and mixtures thereof; and wherein said coating material is selected from the group consisting of polyethylene, polypropylene, polyethylene terephthalate, polyphenylene sulfide and liquid crystalline polymer.

17. The process of claim 15, wherein said filaments are fiberglass reinforcing filaments, and said coating material is selected from the group consisting of polyethylene and polypropylene.

18. The process of claim 15, wherein said coating material comprises an effective amount of a stiffening additive.

19. The process of claim 15, wherein said pultrusion die has an exit opening provided at said defined temperature.

20. The process of claim 15, wherein said formed composite is pultruded rod.

* * * * *